Patented July 2, 1929.

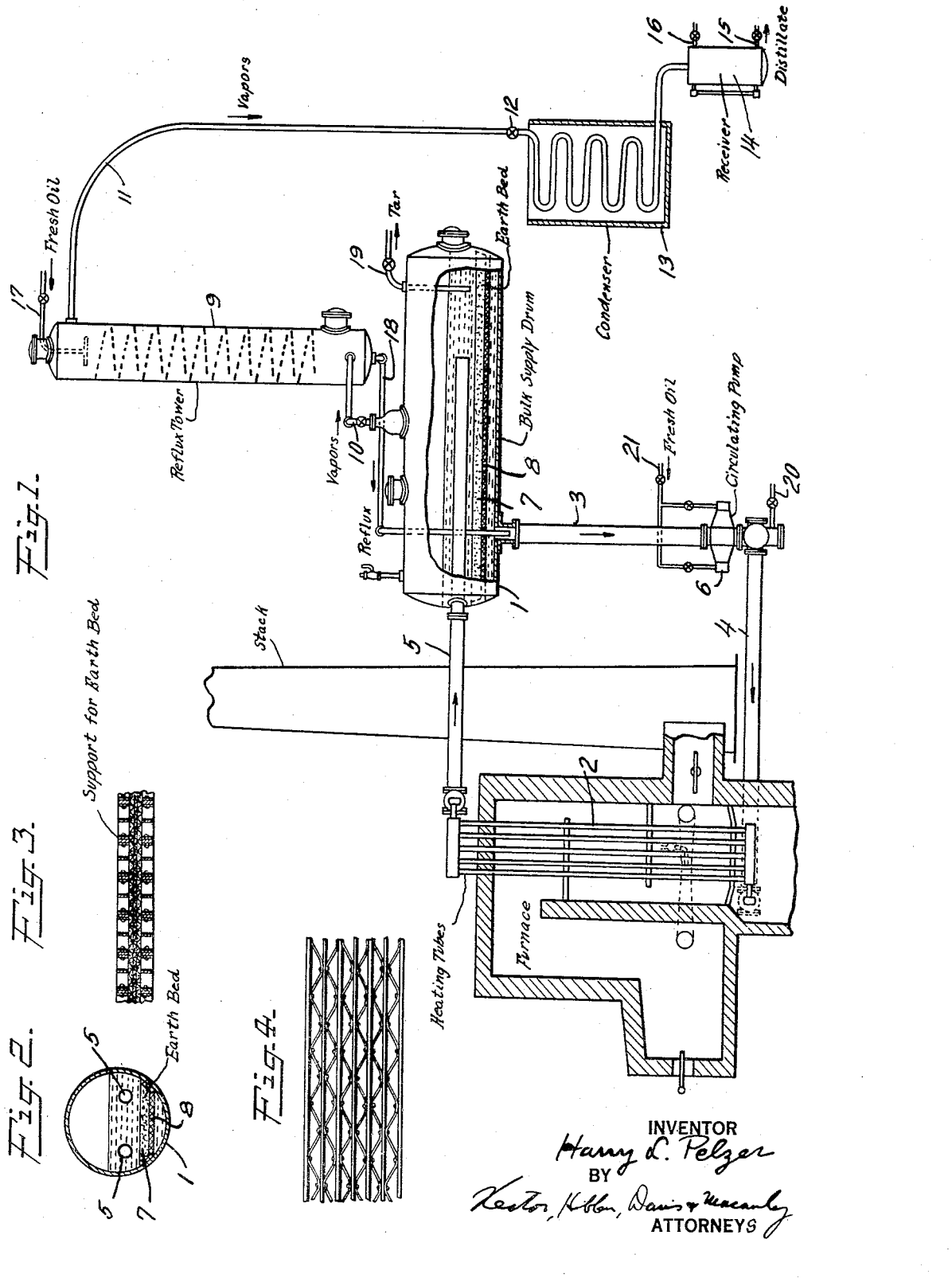

1,719,486

UNITED STATES PATENT OFFICE.

HARRY L. PELZER, OF HIGHLAND, INDIANA, ASSIGNOR TO SINCLAIR REFINING COMPANY, OF NEW YORK, N. Y., A CORPORATION OF MAINE.

APPARATUS FOR CRACKING HYDROCARBON OILS.

Application filed April 16, 1927. Serial No. 184,296.

This invention relates to improvements in apparatus for distilling under pressure heavier and higher boiling hydrocarbon oils, such as gas oil, for the production therefrom of lighter and lower boiling hydrocarbon oils, such as gasoline and gasoline-containing distillates.

In one advantageous method of carrying out such pressure distillation, the charge of heavier oil in the still is circulated through a bed of finely divided, absorbent material, such as fuller's earth, during the distillation operation. This invention relates particularly to an improved support for the bed of absorbent material in such operations.

For carrying out such operations, it is desirable that the support be of a character to retain the finely divided material without unnecessarily restricting the flow of oil therethrough. Likewise, the support must be of sufficient strength not only to carry the weight of the bed of absorbent material but also to withstand the additional stress incident to operation. Freedom from clogging due to material deposited in or absorbed by the bed of absorbent material is also a desirable attribute of such support. The support, moreover, should be of such a character as not to render any substantial portions of the bed of absorbent material ineffective. This invention provides an improved support which satisfies these requirements and which has several important advantages.

The improved support of the present invention is made up of one or more screens arranged between gratings made up of strips arranged edgewise with reference to the screen or screens. The mesh of the screen or screens is proportioned in accordance with the degree of subdivision of the material to be supported. The screen or screens are carried by the grating on which they rest; the edgewise arrangement of the strips making up this grating permits development of a maximum of strength with a minimum of resistance to flow. The screens are held in place on the supporting grating by the overlying grating of similar construction, and this overlying grating also assists in retarding clogging of the screen or screens and in preventing disturbance of the arrangement of the bed of absorbent material on the screens without interfering with the effectiveness of portions of the bed of absorbent material.

The invention will be further described in connection with the accompanying drawings, in which one form of apparatus embodying the invention is illustrated in a somewhat conventional and diagrammatic manner. In the accompanying drawings:

Fig. 1 is an elevation, partly in section and with parts broken away, of a circulatory pressure still embodying this invention;

Fig. 2 is a section of the bulk supply drum shown in Fig. 1;

Fig. 3 is an enlarged, detailed view of a portion of a support embodying the invention, and Fig. 4 is an enlarged plan of a portion of the grate forming the upper and lower elements of the support illustrated in Fig. 3.

The pressure still illustrated is made up of a bulk supply tank 1, a battery of heating tubes 2, and circulating connections 3, 4 and 5 including a circulating pump 6. A body of absorbent material 7, fuller's earth for example, is arranged on a support 8, within the bulk supply drum 1. A reflux tower 9 is arranged above the bulk supply drum 1. Vapors from the bulk supply drum enter the reflux tower through connection 10; vapors from the reflux tower pass through connection 11 and valve 12, by which the pressure in the system may be regulated, to the condenser 13. This condenser discharges into the receiver 14. The distillate product is discharged from the receiver through connection 15 and uncondensed vapors and gases through connection 16. Fresh oil to be supplied to the operation is introduced into the upper end of the reflux tower 9 through connection 17. Reflux condensate and admixed fresh oil flow from the lower end of the reflux tower back to the pressure still through connection 18. Connection 19 is provided for discharging pitch laden oil during operation, and connection 20 is provided for pumping out the still at the end of a run and for initially charging it at the beginning of a run. A part of the fresh oil supplied to the operation may be introduced through the bearings of the circulating pump 6 for cooling and lubrication through connection 21.

In operation, to produce a gasoline-containing pressure distillate from gas oil, for example, the charge of oil is circulated from beneath the bed of absorbent material in the bulk supply drum upwardly through the battery of heating tubes and back to the bulk supply drum. The oil may be heated, for example, to a temperature between about 750° F. and 800° F. as it leaves the battery of heating tubes. The supply of fresh oil and the discharge of pitch laden oil are, with advantage, regulated to maintain the concentration of pitch constituents below saturation in the oil entering the battery of heating tubes. The vapors liberated in the bulk supply drum escape to the reflux tower where the heavier portions are condensed by heat exchange with the incoming fresh oil. The reflux condensate and admixed unvaporized fresh oil are returned to the still charge circulating through the battery of heating tubes. The vapors remaining uncondensed in the reflux tower are taken off and condensed to form the distillate product. The pressure in the system, may, for example, be maintained in the neighborhood of from 100 to 150 pounds per square inch.

The bed of absorbent material in the bulk supply drum of the pressure still may be made up, for example, of fuller's earth of from 16 to 30 mesh. In the still illustrated the bulk supply drum, may, for example, be about nine feet in diameter and about thirty feet long, and the bed of absorbent material may be from ten to eighteen inches deep. Such a bed of fuller's earth may weigh, for example, from four to seven tons or more.

The improved support of the present invention is illustrated in more detail in Fig. 3, this being an enlarged section of a portion of the support designated 8 in Figs. 1 and 2.

This support is made up of two gratings and three interposed screens. The screens are wire mesh screens of ordinary construction. In the arrangement illustrated, the upper and lower screens may, for example, be of 20 mesh and the middle screen of 7 or 8 mesh. The construction of the gratings is better illustrated in Fig. 4. The gratings are made up of a series of strips, alternate strips being straight and those in between being arranged to space the alternate strips, the entire grating being held together by riveting or spot welding at the points where these strips come together. In the composite support, the strips forming the grating are arranged edgewise with reference to the interposed screens. While the overlying grating has several important advantages, it will be apparent that the lower grating and the superposed screen embody several of the advantages of the invention. The lower grating and superposed screen, for example, may be used in connection with other means for retaining the screen on the grating or for preventing disturbance of the earth bed, or the upper grating may be omitted. It will be appreciated that the exact number and arrangement of the screens and the exact construction and arrangement of the gratings may vary. The form of the invention illustrated, however, has been found particularly advantageous.

The invention is also useful in connection with pressure stills differing in construction and arrangement from the particular type in connection with which it has been more particularly described and illustrated.

I claim:

1. In oil stills in which the charge is circulated through a bed of finely divided material, an improved support for the bed of finely divided material comprising a pair of gratings and an interposed screen, said gratings being made up of strips arranged edgewise with reference to the interposed screen.

2. In oil stills in which the charge is circulated through a bed of finely divided material, an improved support for the bed of finely divided material comprising a screen and a supporting grating beneath the screen, said grating being made up of strips arranged edgewise with reference to the screen.

In testimony whereof, I have subscribed my name.

HARRY L. PELZER.